Jan. 15, 1929. 1,699,192
M. HOUDAILLE
ANTIVIBRATORY DEVICE APPLICABLE TO THE STEERING WHEELS OF VEHICLES
Filed April 7, 1926   3 Sheets-Sheet 1
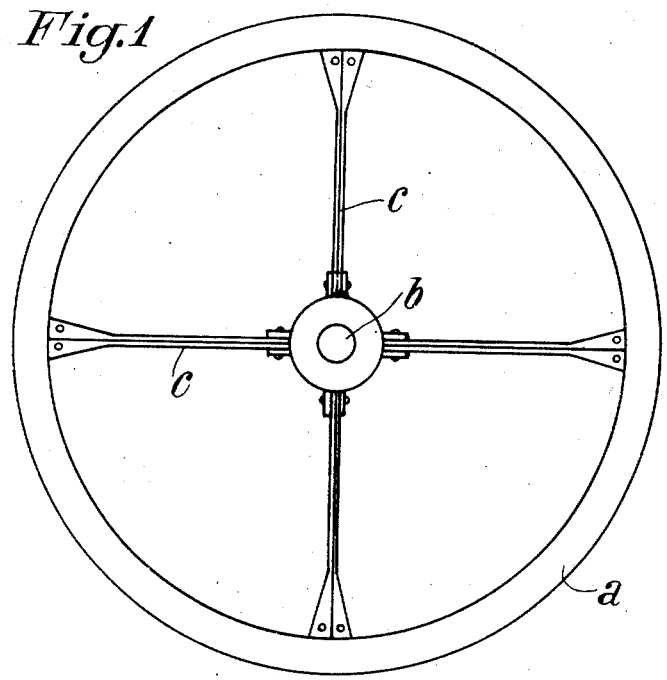
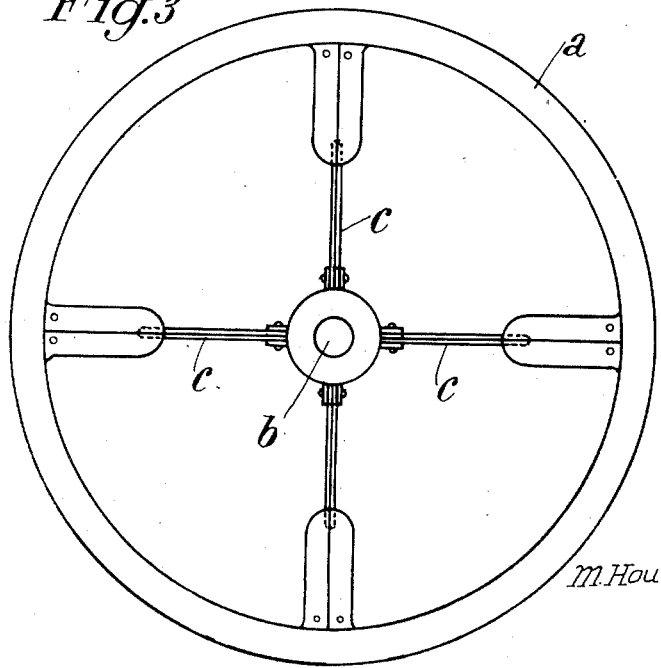
M. Houdaille
INVENTOR Jan. 15, 1929. 1,699,192
M. HOUDAILLE
ANTIVIBRATORY DEVICE APPLICABLE TO THE STEERING WHEELS OF VEHICLES
Filed April 7, 1926   3 Sheets-Sheet 2
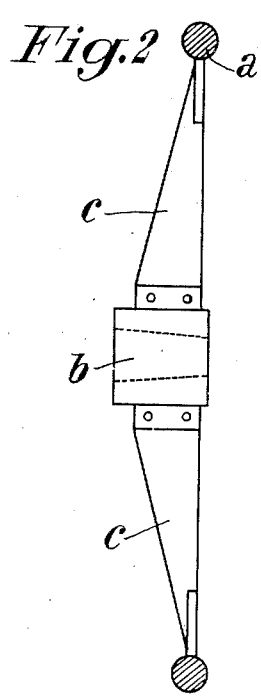
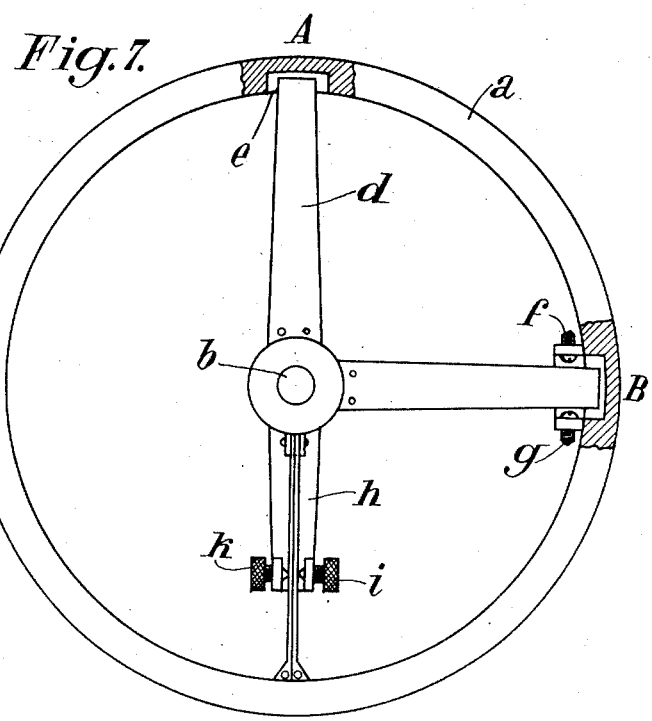
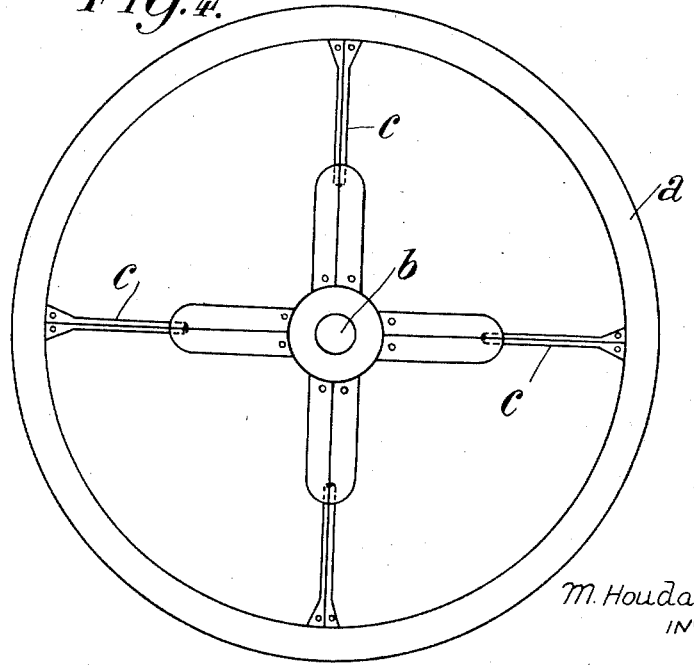
M. Houdaille
INVENTOR
By: Marks & Clerk
Attys Jan. 15, 1929.

M. HOUDAILLE 1,699,192

ANTIVIBRATORY DEVICE APPLICABLE TO THE STEERING WHEELS OF VEHICLES

Filed April 7, 1926 3 Sheets-Sheet 3

M. Houdaille
INVENTOR

By: Marks & Clerk
Attys

Patented Jan. 15, 1929.

1,699,192

UNITED STATES PATENT OFFICE.

MAURICE HOUDAILLE, OF LEVALLOIS-PERRET, FRANCE.

ANTIVIBRATORY DEVICE APPLICABLE TO THE STEERING WHEELS OF VEHICLES.

Application filed April 7, 1926, Serial No. 100,414, and in France April 18, 1925.

It is well known that the vibrations and shocks which are imparted to the steering wheels of motor vehicles circulating on bad or paved roads, cause a great muscular fatigue to the driver, and even an inflammation of the hands after a long journey.

The anti-vibratory device forming the subject-matter of the present invention allows of remedying this inconvenience and essentially consists in rendering supple the steering wheels of vehicles, particularly of motor cars, by connecting the rim of the steering wheel to the steering pillar by resilient means allowing the rim of the steering wheel to resiliently move relatively to the steering pillar, either by rotation about the axis of this pillar, or by rotation about axes at right angles to the latter, or by translations parallel or at right angles to this steering pillar, or again according to a combination of these movements.

Figure 5:
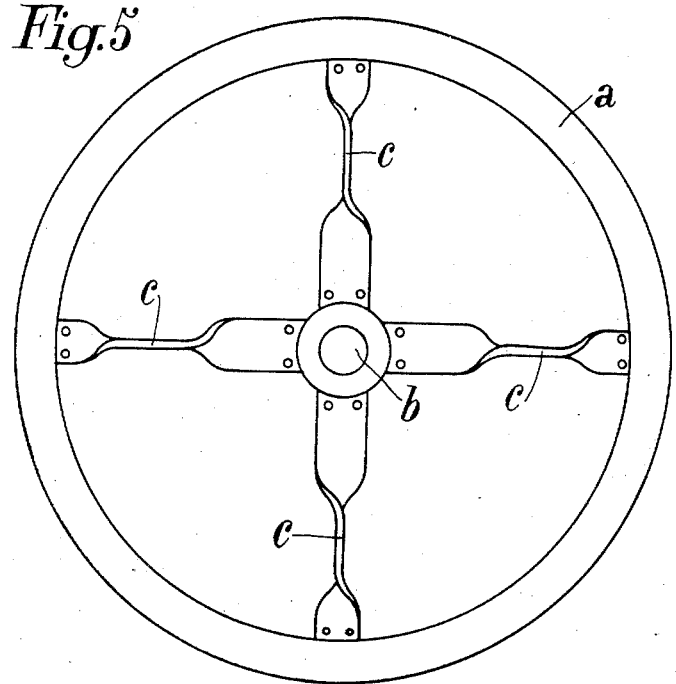
Figure 6:
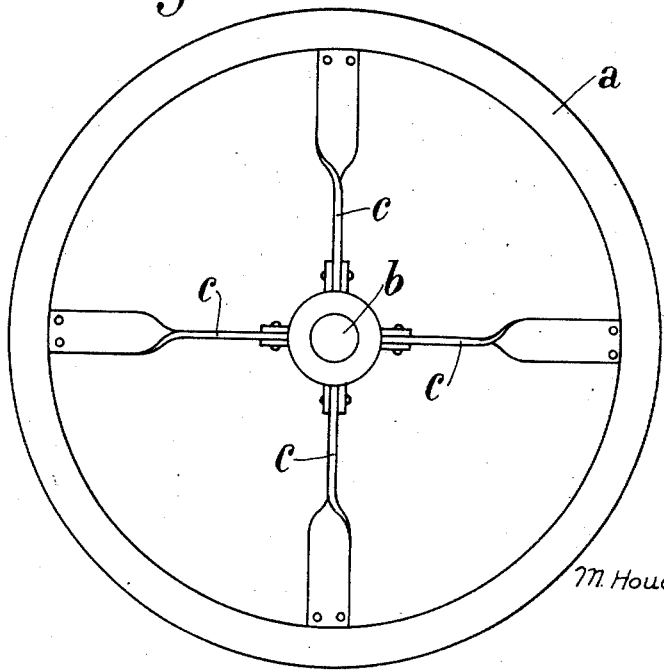

Several forms of construction of this device are illustrated, by way of example only, in the accompanying drawing in which:

Fig. 1 is an elevation of a first form of construction and Fig. 2 is a side view of Fig. 1; Figs. 3 to 7 illustrate in plan view other forms of construction.

If a study is made of the causes of the trepidations felt by the hands of a driver of motor vehicle and transmitted by the steering wheel, it is noted that these oscillations or trepidations mainly occur in a plane at right angles to the steering pillar, some secondary oscillations occurring parallel to this pillar.

In fact the main causes of these trepidations are the following:

(1) The oscillation of the steering pillar carrying the steering wheel, oscillations by rotation about a point which is the point of attachment of the steering box to the chassis and consequently, approximately parallel to the plane of the steering wheel, (2) The displacement of the driver body, relatively to the steering wheel, displacement caused first by the inertia of the body during the displacements of the chassis, secondly by the resiliency of the springs of the cushion. This displacement of the body is approximately an arc of a circle, the feet of the driver, resting on the pedals, forming the axis of this arc;

(3) The shocks transmitted to the steering wheel by the sudden displacements of the front wheels; these shocks give rise to a component in rotation, therefore at right angles to the steering pillar and to an axial component parallel to the latter.

Consequently, it seems more advantageous to give to the steering wheel a degree of freedom at right angles to the pillar of the steering wheel, this freedom being of course limited for permitting nevertheless the control of the steering gear. However, the invention is not limited to the forms of construction of this type and extends to those giving to the rim of the steering wheel all the other degrees of resilient freedom, in combination or not with the preceding one.

In the example of Figs. 1 and 2, the rim $a$ of the steering wheel is connected to the steering pillar $b$ by arms $c$ constituted by one or more flexible blades allowing the rim $a$ to resiliently rock by rotation about the pillar $b$. When the rim $a$ is acted upon for actuating the steering mechanism, the arms $c$ first become distorted to a slight extent, then permit the actuation of the steering pillar.

In the examples of Figs. 3 to 6, the rim has, besides, the degree of freedom previously set forth, the possibility of being subjected to resilient translations relatively to the steering pillar and parallel to the latter, and even rotations the axis of which are at right angles to this pillar. For that purpose, the arms $c$ are so constituted that a portion is distortable at right angles to the steering pillar and the other portion parallel to the latter.

The shape to be given to these arms can vary, as well as the construction, for ensuring a very large number of forms of execution.

The arms can be secured on the skeleton frame of the rim, and on the hub, by any means. They can be made in one or several pieces and constituted in different manners: bent or curved sheet-iron plates, forged or stamped steel members, springs of suitable profile.

They can form a part of the skeleton frame of the steering wheel itself; this skeleton frame can be made in one or more pieces.

In case, for any reason whatever, a greater security should be desired, one or more arms could be rigid, the rigid arm or arms, such as $d$ for instance, moving in a groove $e$ larger than its width for constituting a positive abutment preventing a too large displacement (Fig. 7, form of construction A).

The form of construction B of Fig. 7 is a modification of the form A. Abutments $f, g$ constituted by two lugs each carrying an adjusting screw, allow to exactly determine the displacement of the rigid arm in accordance with the steering and the characteristics of the car.

A third device (form of construction C, Fig. 7) has all its arms flexible. One or more rigid arms $h$, integral with the hub or with the rim, allow to do away at will with the flexibility of one or more arms of the steering wheel, by locking of these arms by means of the screws $i$, $k$, for instance. A supple or a rigid steering wheel is thus obtained.

What I claim as my invention and desire to secure by Letters Patent is:

1. In a steering wheel for vehicles, a wheel rim, elastic arms rigidly connected to the rim and the hub and arranged so that they can be deformed in a plane perpendicular to the geometric axis of the hub and in a plane passing through said axis.

2. In a steering wheel for vehicles, a wheel rim, a hub, elastic arms arranged between the rim and the hub and adapted to be deformed in a plane which passes through the geometric axis of the hub and in a plane perpendicular to said axis, and means for rigidly fixing the ends of said arms to the wheel rim and to the hub.

3. In a steering wheel for vehicles, a wheel rim, a hub, a plurality of elastic arms arranged between the hub and the rim and each consisting of laminated blades which are adapted so that the deformation takes place in a plane passing through the geometric axis of the hub and in a plane perpendicular to said axis, and means for rigidly fixing the ends of each of the blades forming the arms to the wheel rim and to the hub.

4. In a steering wheel for vehicles, a rim, a hub, a plurality of elastic arms arranged between the rim and the hub and each consisting of a plurality of blades arranged in laminated form and positioned so that the elastic deformation takes place at the same time in a plane passing through the geometric axis of the hub and in a plane perpendicular to said axis, and means for rigidly fixing the ends of said laminated blades forming the arms to the wheel rim and to the hub.

5. In a steering wheel for vehicles in combination, a rim, a hub, a plurality of elastic arms not liable to lengthen to a substantial extent and rigidly connected to the rim and the hub and arranged so that they can be deformed in a plane perpendicular to the geometric axis of the hub.

In testimony whereof I have signed my name to this specification.

MAURICE HOUDAILLE.